(12) United States Patent
Takamura (10) Patent No.: US 10,395,337 B2
(45) Date of Patent: Aug. 27, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Akihiro Takamura, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/671,606

(22) Filed: Aug. 8, 2017

(65) Prior Publication Data

US 2018/0047133 A1 Feb. 15, 2018

(30) Foreign Application Priority Data

Aug. 10, 2016 (JP) .................. 2016-158003

(51) Int. Cl.
*G09G 5/00* (2006.01)
*G06T 1/60* (2006.01)
*G06T 3/00* (2006.01)
*G06T 3/40* (2006.01)

(52) U.S. Cl.
CPC .............. *G06T 1/60* (2013.01); *G06T 3/0093* (2013.01); *G06T 3/4015* (2013.01); *G06T 3/4038* (2013.01)

(58) Field of Classification Search
CPC .......... H04N 5/74; H04N 5/7408; H04N 9/31; H04N 9/3188; H04N 5/2628; G06T 5/006; G06T 3/00; G06T 3/0093; G09G 3/002
See application file for complete search history.

(56) References Cited

U.S. PATENT DOCUMENTS

| | | | |
|---|---|---|---|
| 6,367,933 B1 * | 4/2002 | Chen .................... | H04N 3/2335 348/744 |
| 2010/0054620 A1 * | 3/2010 | Kobayashi ............ | G06T 3/0093 382/256 |
| 2013/0021585 A1 * | 1/2013 | Tamura .................... | G09G 5/00 353/69 |

FOREIGN PATENT DOCUMENTS

JP 2005-267457 A 9/2005

* cited by examiner

*Primary Examiner* — Hau H Nguyen
(74) *Attorney, Agent, or Firm* — Canon USA, Inc., IP Division (57) ABSTRACT

A by-divided area reduction ratio calculation unit determines a reduction ratio based on a deformation parameter for image deformation processing for each of a plurality of divided areas constituting an input image. A by-divided area reduction unit reduces, based on the reduction ratio determined for each of the divided areas, an image in the divided area, and stores the reduced image in a storage unit. A deformation unit performs image deformation processing based on the deformation parameter for the reduced image in the divided area stored in the storage unit.

12 Claims, 6 Drawing Sheets

IMAGE PROCESSING APPARATUS, IMAGE PROCESSING METHOD, AND STORAGE MEDIUM

BACKGROUND

Field of the Disclosure

The present disclosure generally relates to image processing and, more particularly, to an image processing apparatus which performs image deformation processing, an image processing method, and a storage medium.

Description of the Related Art

Image deformation processing is used for projection position correction of a front projector and aberration correction of a camera lens, for example. However, in the image deformation processing, both a scanning order of input pixels and a scanning order of output pixels cannot be a simple scanning order (e.g., a raster order). Thus, in the image deformation processing, the scanning order of the input pixels and the scanning order of the output pixels are generally simplified via a frame buffer. Japanese Patent Application Laid-Open No. 2005-267457 discusses performing image deformation processing to correct distortion of a lens from a captured image by finding coordinates of an output image according to a scanning order of a reduced image obtained by reducing the captured image to deform the image and by writing the deformed image into a frame buffer.

If respective scanning speeds of the input pixels and the output pixels are set to a predetermined number of pixels per cycle when the image deformation processing is performed, the respective numbers of pixels per cycle in writing and reading into and from the frame buffer change depending on a reduction ratio in the image deformation processing. The reduction ratio is defined to be equal to the number of output pixels/the number of input pixels. An enlargement ratio is also defined to be equal to the number of output pixels/the number of input pixels, like the reduction ratio. Accordingly, the reduction ratio <1.0 when the image deformation processing is reduction, and the reduction ratio >1.0 when the image deformation processing is enlargement, for example.

A frame buffer having a resolution used for projection position correction of a front projector and aberration correction of a camera lens has a large capacity. Thus, a dynamic random access memory (DRAM) is generally used for the frame buffer. However, enlargement of a memory bandwidth of the DRAM causes a significant increase in cost. Therefore, it becomes important in cost reduction that a maximum value of the respective numbers of pixels per cycle in writing and reading into and from the frame buffer in performing image deformation processing is reduced.

However, in a technique discussed in Japanese Patent Application Laid-Open No. 2005-267457, described above, if even a portion of an image, for example, may be enlarged in the image deformation, a peak value of the memory bandwidth of the DRAM to cope with the portion to be enlarged becomes large. Thus, the maximum value of the respective numbers of pixels per cycle in writing and reading into and from the DRAM cannot be reduced so that cost reduction is not easily implemented.

SUMMARY OF THE INVENTION

The present disclosure is directed to making a peak value of a memory bandwidth of a frame buffer used for image deformation processing smaller.

According to one or more aspects of the present disclosure, an image processing apparatus includes a determination unit configured to determine a reduction ratio based on a deformation parameter for image deformation processing for each of a plurality of divided areas constituting an input image, a reduction unit configured to reduce, based on the reduction ratio determined for each of the divided areas, an image in the divided area and to store the reduced image in a memory, and a deformation unit configured to perform image deformation processing based on the deformation parameter for the reduced image in the divided area stored in the memory.

Further features of the present disclosure will become apparent from the following description of exemplary embodiments with reference to the attached drawings.

DESCRIPTION OF THE EMBODIMENTS

Exemplary embodiments of one or more aspects of the present disclosure will be described below with reference to the accompanying drawings. The exemplary embodiments described below each illustrate one example in which the present disclosure is specifically practiced, and the present disclosure is not limited to the following exemplary embodiments.

Figure 1:
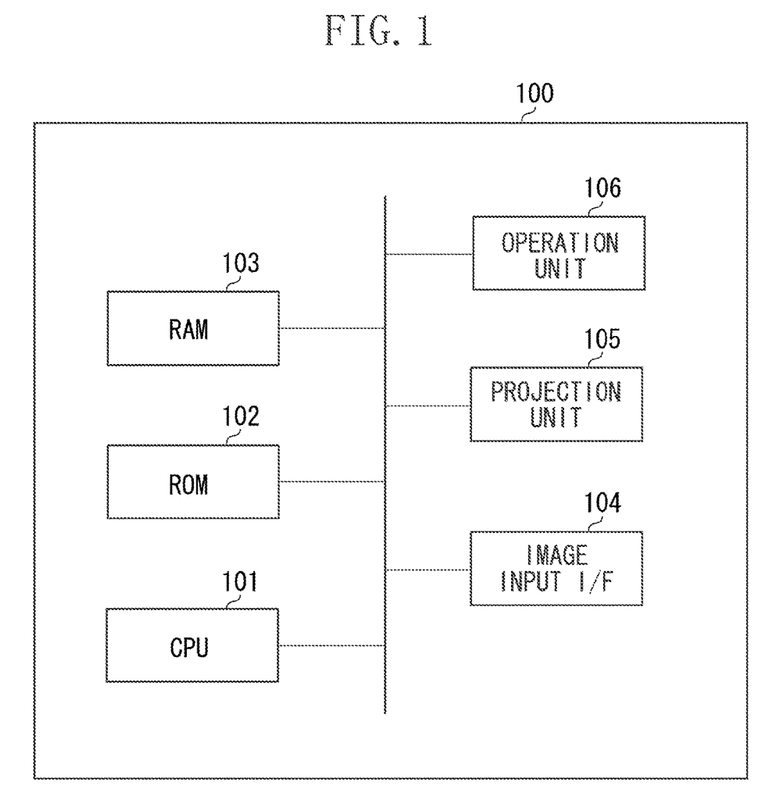
FIG. 1 illustrates a schematic entire configuration of an image processing apparatus according to the present exemplary embodiment.

FIG. 1 is a block diagram illustrating a schematic hardware configuration of a projection apparatus (projector) according to an example of application of an image processing apparatus according to a first exemplary embodiment. A projection apparatus 100 illustrated in FIG. 1 includes a central processing unit (CPU) 101, a read-only memory (ROM) 102, a random access memory (RAM) 103, an operation unit 106, a projection unit 105, and an image input interface (I/F) 104, for example.

The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

The CPU 101, which may include one or more processors and one or more memories, performs system control and various types of image processing for the projection apparatus 100. The ROM 102 is a read-only memory storing a program and various types of parameters according to the present exemplary embodiment. The program and the parameters may be supplied from recording media such as a flexible disk, a hard disk, an optical disk, a magneto-optical disk, a magnetic tape, and a memory card in addition to the ROM 102, or may be supplied via a communication network. The RAM 103 is a rewritable memory temporarily storing a program and various types of data supplied from outside, and is also used as a frame buffer temporarily storing image data input from outside. In the present exemplary embodiment, the RAM 103 includes a DRAM, for example.

The projection unit 105 projects, onto a screen, an image based on image data input by the image input I/F 104 and temporarily stored in the RAM 103 and image data stored in the ROM 102. The operation unit 106 sends to the CPU 101 operation information corresponding to various types of operations from a user of the projection apparatus 100 according to the present exemplary embodiment. The image input I/F 104 is an interface to which the image data corresponding to the image projected onto the screen is input from outside, for example.

Figure 2:
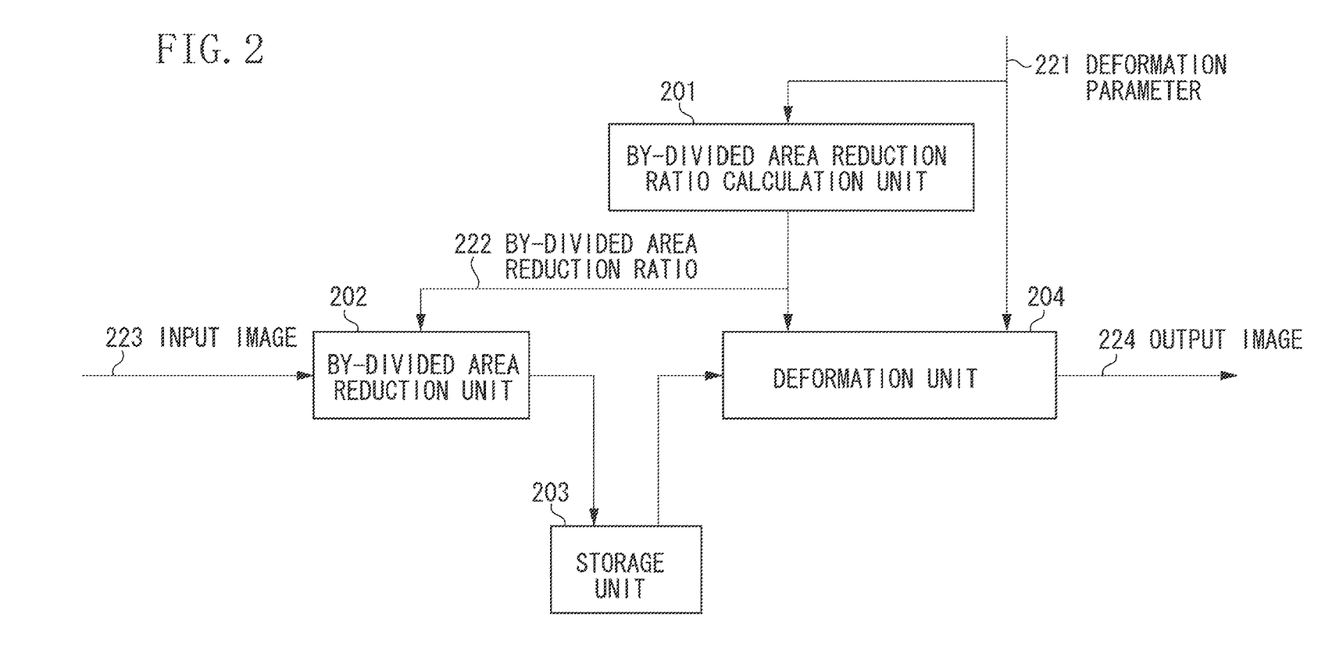
FIG. 2 illustrates a schematic configuration of a principal part of the image processing apparatus according to the present exemplary embodiment.

FIG. 2 illustrates a schematic functional block for implementing image processing (image deformation processing) performed in the projection apparatus 100 according to the present exemplary embodiment. The projection apparatus 100 according to the present exemplary embodiment includes a by-divided area reduction ratio calculation unit 201 (hereinafter represented as a calculation unit 201), a by-divided area reduction unit 202 (hereinafter represented as a reduction unit 202), a storage unit 203, and a deformation unit 204, respectively, as components for performing image deformation processing. The calculation unit 201, the reduction unit 202, and the deformation unit 204 illustrated in FIG. 2 may be a software configuration implemented when the CPU 101 executes a program according to the present exemplary embodiment, or at least some of the components may be implemented by a hardware configuration. For example, processing of the calculation unit 201 may be performed by the CPU 101, and processing of the reduction unit 202 and the deformation unit 204 may be performed by dedicated hardware (e.g., Application Specific Integrated Circuit (ASIC)) based on control of the CPU 101. In the present exemplary embodiment, the hardware configuration and the software configuration are not distinguished. The storage unit 203 illustrated in FIG. 2 corresponds to the RAM 103 illustrated in FIG. 1.

Figure 3:
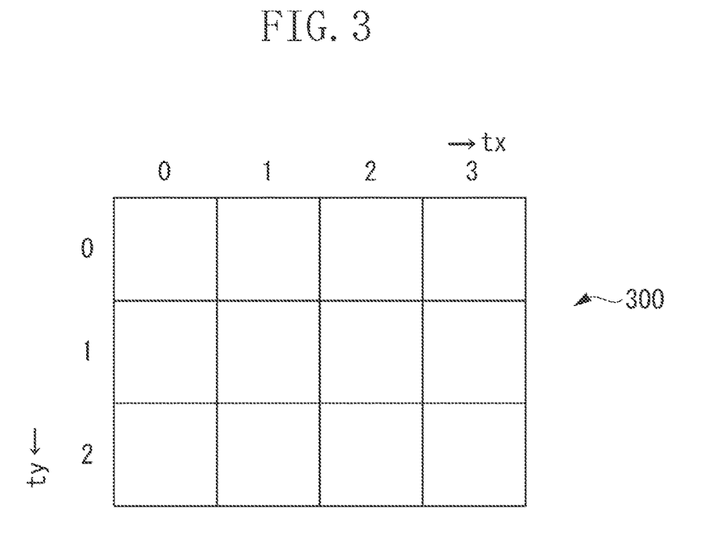
FIG. 3 illustrates divided areas.

In the present exemplary embodiment, both an input image 223 and an output image 224 are each an image composed of 1024 pixels in a horizontal direction (X-direction) by 768 pixels in a vertical direction (Y-direction) to simplify description. In the present exemplary embodiment, the input image 223 composed of 1024×768 pixels is divided into a plurality of divided images for each rectangular area composed of 256×256 pixels, to perform reduction processing, described below, for each divided image (hereinafter represented as a divided area) and perform image deformation processing, described below, for each reduced divided area. Divided areas are formed by dividing an input image 300 as illustrated in FIG. 3 serving as an example of the input image 223 into 4×3 areas where the number of areas in the horizontal direction (X-direction) is "4" and the number of areas in the vertical direction (Y-direction) is "3", for example. In the present exemplary embodiment, each of the divided areas is represented by coordinates (tx, ty), where 0≤tx<4 and 0≤ty<3. The size of the divided area (a size represented by the number of horizontal pixels by vertical pixels) is not limited to the above-described 256×256 pixels but may be any size. Particularly if the size of the divided area is reduced, a decrease in processing efficiency occurring due to the fact that the input image leaves some pixels as a remainder when divided can be reduced. On the other hand, when transfer to the frame buffer is performed, if the size of each of the divided areas is small, the number of transfer pixels for the divided area is reduced so that use efficiency of a memory bandwidth may also be reduced. Thus, the size of the divided area is desirably determined in consideration of a balance between such advantages and disadvantages. In the present exemplary embodiment, the input image 300 is divided into 4×3 areas as an example considering the foregoing. While an example in which the divided areas are of the same size has been taken in the present exemplary embodiment, the divided areas may be respectively of different sizes (non-uniform image sizes), and further the divided areas may be in not a rectangular shape but any shape.

In the present exemplary embodiment, one pixel is defined to occupy a range of X−0.5 or more and less than X+0.5 and a range of Y−0.5 or more and less than Y+0.5 centered at designated (X, Y) coordinates. A method for setting coordinates of one pixel can be coped with by correcting the coordinates, although it may be another method.

While a projection transformation is taken as an example of image deformation processing to simplify description in the present exemplary embodiment, the present disclosure is also applicable to deformation represented by a polynomial, like when aberration of a camera lens is corrected using image processing, for example. That is, even in the image processing for correcting the aberration of the camera lens, an image captured by a camera is divided in a lattice shape into divided areas, and image deformation processing is performed for each of the divided areas.

Figure 4:
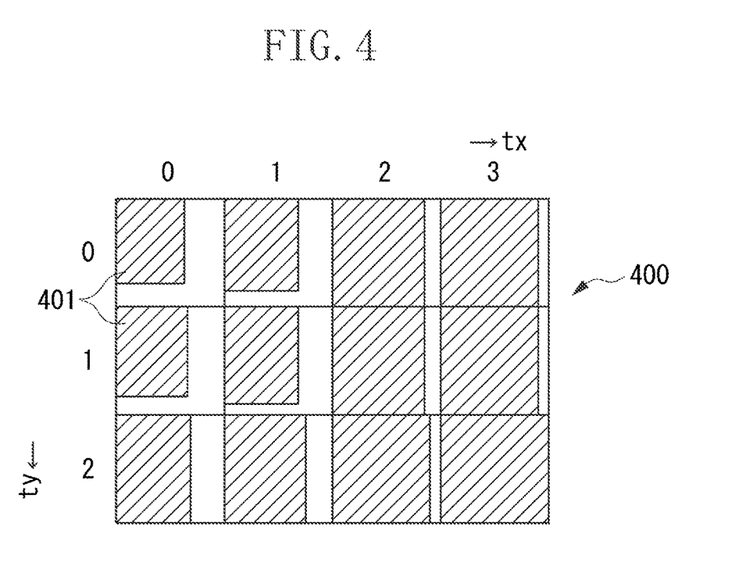
FIG. 4 illustrates an output example of a by-divided area reduction unit.

In a configuration of the functional block illustrated in FIG. 2, the input image 223 corresponds to the input image 300 illustrated in FIG. 3. The reduction unit 202 divides the input image 223 into a plurality of rectangular divided areas as illustrated in FIG. 3, to perform reduction processing for an image in each of the divided areas depending on a by-divided area reduction ratio 222 calculated by the calculation unit 201. An image 400 illustrated in FIG. 4 is a conceptual representation of an example of reduced divided areas 401 obtained by respectively reducing the divided areas in the input image 300 illustrated in FIG. 3 based on the reduction ratios. The calculation unit 201 calculates the reduction ratio for each of the divided areas based on a deformation parameter 221, and supplies the calculated reduction ratio to the reduction unit 202 and the deformation unit 204. The deformation parameter 221 is a parameter for image deformation processing created by a program according to the present exemplary embodiment, for example, and specifically data represented by a matrix of a projection transformation, as described below. Details of processing for calculating the reduction ratio by the calculation unit 201 for each of the divided areas based on the deformation parameter 221 will be described below. Data about each of the reduced divided areas 401 after the reduction processing in the reduction unit 202 is stored in the storage unit 203.

The order in which the input image 223 is input to the reduction unit 202 may be an order by any method such as a raster method for each image, a raster method for each image in the reduced divided area, or an input method for 8×8 pixels that is, for example, smaller than the size of the divided area. In the present exemplary embodiment, description is simplified assuming that the input order is by the raster method for each image. As for a storage method in storing the data about the reduced divided area in the storage unit 203, various methods can be used. In the present exemplary embodiment, data about each of the reduced divided areas is stored so that upper left coordinates of the reduced divided area match upper left coordinates of the divided area before the reduction. From a viewpoint of continuing an access to the storage unit 203 as much as possible to improve efficiency of a memory access, data about each of the reduced divided areas may be stored continuously from the upper left coordinates of the divided area before the reduction. Thus, the storage unit 203 holds data for each of the reduced divided areas by the reduction unit 202.

The deformation unit 204 performs image deformation processing depending on a deformation amount determined based on the by-divided area reduction ratio 222 and the deformation parameter 221 for image data for each of the reduced divided areas stored in the storage unit 203. More specifically, the deformation unit 204 performs, when performing image deformation processing based on the deformation parameter 221, image deformation processing considering that the image data for each of the reduced divided areas stored in the storage unit 203 is reduced at the by-divided area reduction ratio 222 calculated by the calculation unit 201. Details of the image deformation processing in the deformation unit 204 will be described below. Image data subjected to the image deformation processing for each of the reduced divided areas by the deformation unit 204 is output as the output image 224.

Details of processing for calculating a reduction ratio for each divided area by the calculation unit 201 will be described below.

The calculation unit 201 is an example of determination means, and calculates respective X-direction (horizontal direction) reduction ratios and Y-direction (vertical direction) reduction ratios, described below, for all divided areas. In the present exemplary embodiment, the calculation unit 201 calculates an X-direction reduction ratio "ratioX (tx, ty)" and a Y-direction reduction ratio "ratioY (tx, ty)" for each divided area (tx, ty), where 0≤tx<4 and 0≤ty<3.

To prevent the quality of an image reduced in the divided area from deteriorating by enlarging the image, the calculation unit 201 calculates a maximum value of X-direction reduction ratios and Y-direction reduction ratios in the divided area. In a case where the image deformation processing according to the present exemplary embodiment is a projection transformation, a reduction ratio at coordinates of any one of four corners of the divided area, for example, is a maximum value of reduction ratios in the divided area. Thus, the calculation unit 201 calculates a maximum value of respective X-direction reduction ratios and Y-direction reduction ratios at the coordinates of the four corners of the divided area.

At this time, the calculation unit 201 calculates a reduction ratio at coordinates of each of the corners:

(X−0.5, Y−0.5) at the upper left corner
(X+0.5, Y−0.5) at the upper right corner
(X−0.5, Y+0.5) at the lower left corner (X+0.5, Y+0.5) at the lower right corner
If a divided area (0, 0) at the upper left of FIG. 3 is taken as an example, the calculation unit 201 calculates an X-direction reduction ratio and a Y-direction reduction ratio for the upper left divided area (0, 0) at the following coordinates:
  (−0.5, −0.5) at the upper left corner
  (255.5, −0.5) at the upper right corner
  (−0.5, 255.5) at the lower left corner
  (255.5, 255.5) at the lower right corner
More specifically, the calculation unit 201 calculates the X-direction reduction ratio and the Y-direction reduction ratio at the coordinates of each of the four corners.

Generally, at all candidate coordinates (e.g., coordinates of all pixels) where a reduction ratio in a divided area is a maximum value of reduction ratios in the divided area, for example, respective X-direction reduction ratios and Y-direction reduction ratios are calculated, and then a maximum value of the reduction ratios is calculated. On the other hand, in the present exemplary embodiment, a maximum value of the respective X-direction reduction ratios and Y-direction reduction ratios at the coordinates of the four corners of the divided area is calculated, as described above. In the present exemplary embodiment, the maximum value of the X-direction reduction ratios and the Y-direction reduction ratios at the coordinates of the four corners of the divided area is set as a reduction ratio for the divided area.

Further, in the present exemplary embodiment, a reduction ratio for each divided area is calculated as a value corresponding to image deformation processing. In the present exemplary embodiment, an example in which a projection transformation is performed is taken, so that the calculation unit 201 uses matrices m11 to m33 representing a projection transformation as a deformation parameter for image deformation processing, to calculate a reduction ratio based on the matrices m11 to m33 representing the projection transformation. More specifically, the calculation unit 201 first uses matrices m11 to m33 representing a projection transformation, to calculate an X-direction reduction ratio "Xratio" and a Y-direction reduction ratio "Yratio" by a following formula (1):

$$z = m31 \cdot x + m32 \cdot y + m33$$

$$dz = 1/z$$

$$X\text{ratio} = m11 \cdot dz - m31(m11 \cdot x + m12 \cdot y + m13)dz^2$$

$$Y\text{ratio} = m22 \cdot dz - m32(m21 \cdot x + m22 \cdot y + m23)dz^2 \qquad (1)$$

The calculation unit 201 finds a maximum value of respective X-direction reduction ratios "Xratio" and Y-direction reduction ratios "Yratio" at the coordinates of the four corners of the divided area, and sets the maximum value as the reduction ratio for the divided area.

Further, in order to reduce a memory bandwidth at the time of writing into a frame buffer, the calculation unit 201 sets the X-direction reduction ratio to "1" in a case where the X-direction reduction ratio in the divided area exceeds i.e., in a case where the image deformation processing is enlargement. Thus, in the reduction unit 202, enlargement in the X-direction is not performed. Similarly, the calculation unit 201 also sets the Y-direction reduction ratio to "1" in a case where the Y-direction reduction ratio in the divided area exceeds "1", so that enlargement in the Y-direction is not performed. Thus, the calculation unit 201 calculates the X-direction reduction ratio and the Y-direction reduction ratio for each of the divided areas.

Details of reduction processing for each of the divided areas in the reduction unit 202 will be described.

The reduction unit 202 calculates input pixel coordinates for each of the pixels composing the input image 223, and calculates a divided area including the input pixel coordinates, to perform reduction processing corresponding to the reduction ratio calculated by the calculation unit 201. The reduction unit 202 outputs image data for each of reduced divided areas created by the reduction processing to the storage unit 203, and the storage unit stores the output image data.

When the input pixel coordinates are represented by (srcx, srcy), and the input image 223 is input in a raster order, like in the present exemplary embodiment, the reduction unit 202 calculates coordinates satisfying 0≤srcx<1024 and 0≤srcy<768 in the raster order for each of the pixels composing the input image 223.

Further, in calculation of the divided area including the input pixel coordinates (srcx, srcy), the reduction unit 202 calculates which of divided areas (tx, ty) includes the input pixel coordinates (srcx, srcy). In the present exemplary embodiment, the divided area is composed of 256×256 pixels. Therefore, the divided area (tx, ty) can be calculated by a formula (2):

$$(\text{floor}((srcx+0.5)/256), \text{floor}((srcy+0.5)/256)) \quad (2)$$

In the formula (2), floor(x) is generally called a floor function, and is a function for returning to a real number x a maximum integer which is x or less.

The reduction ratio 202 then performs the reduction processing corresponding to the reduction ratio calculated by the calculation unit 201 for the divided area. As an algorithm for the reduction processing at this time, various algorithms can be used. Examples of the algorithm for the reduction processing can include various types of algorithms such as a 0-order hold method, a bilinear method, a bicubic method, and a Lanczos method.

By such reduction processing, the input pixel coordinates (srcx, srcy) are converted into coordinates in an image for each of the divided areas (tx, ty) represented by a formula (3):

$$(((((srcx+0.5)\bmod 256)-0.5)\cdot \text{ratio}X(tx,ty),$$

$$(((srcy+0.5)\bmod 256-0.5)\cdot \text{ratio}Y(tx,ty)) \quad (3)$$

In the formula, "mod" represents a remainder. When R=A mod B, for example, a remainder R is left when A is divided by B. The remainder R satisfies a relationship of 0≤R<B.

Figure 5:
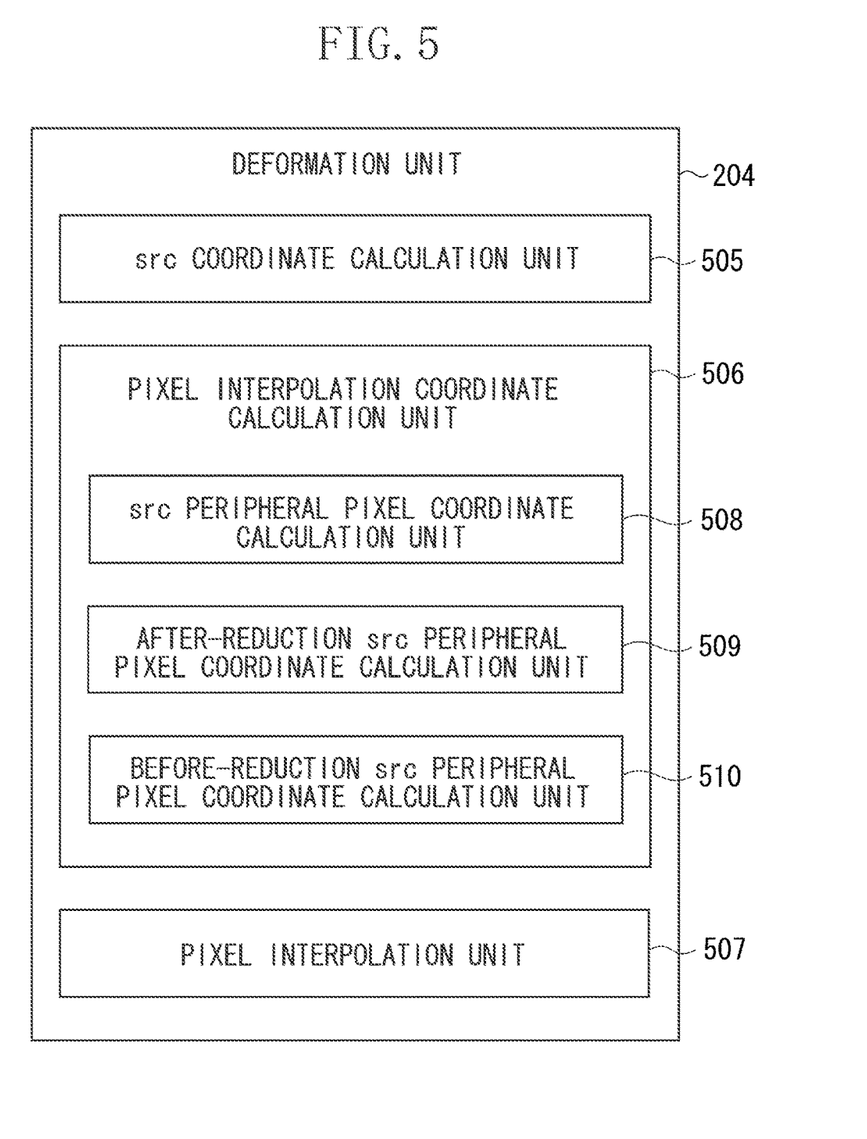
FIG. 5 is a functional block diagram of a deformation unit.

A configuration of the deformation unit 204 and details of the projection transformation will be described.

The deformation unit 204 includes a src coordinate calculation unit 505 (hereinafter represented as a coordinate calculation unit 505), a pixel interpolation coordinate calculation unit 506 (hereinafter represented as an interpolation coordinate calculation unit 506), and a pixel interpolation unit 507.

The coordinate calculation unit 505 generates dst coordinates (dstx, dsty) in a scanning order where image data is output as the output image 224, and finds src coordinates (srcx, srcy) corresponding to the dst coordinates (dstx, dsty) by a coordinate transformation. The src coordinates are coordinates of each of four vertexes of a square in a reduced divided area to be input, and the dst coordinates are coordinates of each of four vertexes in a divided area in an output corresponding to the coordinates of the four vertex in the reduced divided area to be input. In the projection transformation taken as an example in the present exemplary embodiment, the coordinate transformation can be calculated in a following formula (4). In the formula (4), $m^{-1}11$ to $m^{-1}33$ are inverse matrices corresponding to the above-described matrices m11 to m33 in the projection transformation:

$$srcz=m^{-1}31\cdot dstx+m^{-1}32\cdot dsty+m^{-1}33 srcx=(m^{-1}11\cdot dstx+m^{-1}12\cdot dsty+m^{-1}13)/srcz srcy=(m^{-1}21\cdot dstx+m^{-1}22\cdot dsty+m^{-1}23)/srcz \quad (4)$$

The interpolation coordinate calculation unit 506 calculates, on the src coordinates (srcx, srcy), pixel coordinates used for pixel interpolation from the src coordinates. The srx coordinates are calculated considering that the image for each of the divided areas stored in the storage unit 203 is subjected to reduction processing at the reduction ratio for the divided area calculated by the calculation unit 201. Thus, in the present exemplary embodiment, the interpolation coordinate calculation unit 506 converts coordinates of each pixel into after-reduction pixel coordinates, and then inversely converts the after-reduction pixel coordinates into before-reduction pixel coordinates, to calculate pixel interpolation coordinates.

First, an src peripheral pixel coordinate calculation unit 508 (hereinafter represented as a peripheral coordinate calculation unit 508) in the interpolation coordinate calculation unit 506 finds from the src coordinates (srcx, srcy) src coordinates of a pixel before reduction. In a pixel interpolation unit 507 described in the present exemplary embodiment, interpolation is performed by interpolating up to three of pixels at four points surrounding the src coordinates. Thus, the peripheral coordinate calculation unit 508 sets coordinates of each of four points, described below, as src peripheral pixel coordinates (srcpx[i], srcpy[i]), where i=0 to 3:

$$i=0(\text{floor}(srcx-0.5),\text{floor}(srcy-0.5))$$

$$i=1(\text{floor}(srcx+0.5),\text{floor}(srcy-0.5))$$

$$i=2(\text{floor}(srcx-0.5),\text{floor}(srcy+0.5))$$

$$i=3(\text{floor}(srcx+0.5),\text{floor}(srcy+0.5))$$

Next, an after-reduction src peripheral pixel coordinate calculation unit 509 (hereinafter represented as an after-reduction peripheral coordinate calculation unit 509) calculates pixel coordinates used for interpolation. More specifically, the after-reduction peripheral coordinate calculation unit 509 performs a coordinate transformation for reducing each of the src peripheral pixel coordinates (srcpx[i], srcpy[i]), where i=0 to 3. Thus, pixel coordinates (srcrx[i], srcry[i]), where i=0 to 3, after the reduction are obtained.

The after-reduction peripheral coordinate calculation unit 509 converts, when the pixel coordinates (srcrx[i], srcry[i]), where i=two of 0 to 3, are the same coordinates by reduction, the src coordinates (srcx, srcy) into after-reduction pixel coordinates (srcrox, srcroy). The after-reduction peripheral coordinate calculation unit 509 confirms whether the after-reduction pixel coordinates (srcrox, srcroy) satisfy a relationship given by a following formula (5):

$$srcrx[0]\leq srcrox \text{ and } srcry[0]\leq srcroy$$

$$srcrx[1]\geq srcrox \text{ and } srcry[1]\leq srcroy$$

$$srcrx[2]\leq srcrox \text{ and } srcry[2]\geq srcroy$$

$$srcrx[3]\geq srcrox \text{ and } srcry[3]\geq srcroy \quad (5)$$

If the relationship given by the formula (5) is not satisfied, the after-reduction peripheral coordinate calculation unit 509 adds or subtracts one to or from the pixel coordinates (srcrx[i], srcry[i]) not satisfying the relationship given by the formula (5) until the relationship given by the formula (5) is satisfied. That is, the after-reduction peripheral coordinate calculation unit 509 enlarges the pixel coordinates (srcrx[i], srcry[i]), where i=four of 0 to 3, until the pixel coordinates (srcrox, srcroy) are surrounded on the outside thereof.

Then, a before-reduction src peripheral pixel coordinate calculation unit 510 (hereinafter represented as a before-reduction peripheral coordinate calculation unit 510) finds after-reduction pixel coordinates to calculate an interpolation coefficient in the pixel interpolation unit 507. More specifically, the before-reduction peripheral coordinate calculation unit 510 performs a coordinate inverse transformation for reducing the after-reduction pixel coordinates (srcrx[i], srcry[i]), where i=0 to 3, for each divided area to calculate the interpolation coefficient in the pixel interpolation unit 507. Thus, before-reduction coordinates (srcdx[i], srcdy[i]), where i=0 to 3, are obtained.

The pixel interpolation unit 507 calculates, from the before-reduction coordinates (srcdx[i], srcdy[i]), where i=0 to 3, and a pixel value [i], where i=0 to 3, in the coordinates (srcrx[i], srcry[i]), where i=0 to 3, corresponding thereto, a value of an interpolated pixel. More specifically, the pixel interpolation unit 507 first selects a pixel used for interpolation and reads out data about the pixel from the storage unit 203. While pixels at four points are used in bilinear interpolation as an example of a method for pixel interpolation, four points on three-dimensional coordinates (srcdx[i], srcdy[i], pixel value [i]) are not generally on the same plane. In the present exemplary embodiment, the pixel interpolation unit 507 calculates a distance d[i], where i=0 to 3, between the before-reduction coordinates (srcdx[i], srcdy[i]), where i=0 to 3, and the src coordinates (srcx, srcy), and determines pixels at three points in ascending order of distance d[i] from the src coordinates (srcx, srcy). The pixel interpolation unit 507 reads out data about the three pixels from the storage unit 203, and performs interpolation using the data. The distance d[i] is found by $\sqrt{((srcdx[i]-srcx)^2+(srcdy[i]-srcy)^2)}$, for example, in the present exemplary embodiment.

The pixel interpolation unit 507 sets, in a case where a point satisfying the distance d[i]=0 exists, the before-reduction coordinates (srcdx[i], srcdy[i]), where i=0 to 3, are the same as the src coordinates (srcx, srcy). Therefore, a pixel value after interpolation is set as a pixel value [i]. On the other hand, in another case (in a case where a point satisfying the distance d[i]=0 does not exist), the pixel interpolation unit 507 selects three points in ascending order of distance d[i] from the src coordinates (srcx, srcy), for example, and finds an equation of a three-dimensional plane including four points on the three-dimensional coordinates (srcdx[i], srcdy[i], pixel value [i]). The pixel interpolation unit 507 calculates a pixel value at the src coordinates (srcx, srcy) using the equation, to calculate a pixel value after interpolation.

While the above-described example can be generally used when the before-reduction coordinates (srcdx[i], srcdy[i]), i=0 to 3, respectively exist in the different divided areas (tx, ty), the before-reduction coordinates (srcdx[i], srcdy[i]), i=0 to 3, can also be subjected to bilinear interpolation when they exist in the same divided area (tx, ty).

Figure 6:
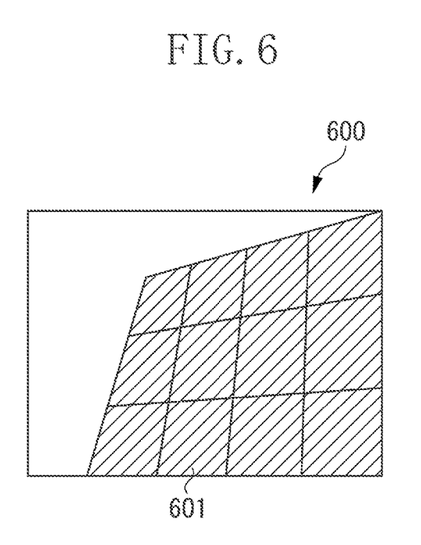
FIG. 6 illustrates an output example of the deformation unit.

FIG. 6 illustrates an example of an output image 600 after image deformation processing by the deformation unit 204. The output image 600 corresponds to the output image 224 illustrated in FIG. 2. As illustrated in FIG. 6, the output image 600 subjected to the image deformation processing becomes a deformed image 601 by respectively deforming its divided areas and combining the deformed divided areas.

As described above, in the projection apparatus 100 according to the first exemplary embodiment, a reduction ratio is calculated for each of divided areas based on a deformation parameter for image deformation processing, and each of the divided areas is reduced at the reduction ratio for the divided area and is written into a frame buffer (storage unit 203). That is, the frame buffer stores image data about a divided area reduced at the reduction ratio for each of the divided areas. Therefore, a peak value in a memory bandwidth becomes smaller when image data reduced for each of the divided areas is stored than when an entire image corresponding to one screen is reduced and stored, for example, so that a frame buffer having a large memory bandwidth is not required, enabling cost reduction. Image data for each of the reduced divided areas stored in the frame buffer is set as image data reduced at the reduction ratio for the divided area based on the deformation parameter for the image deformation processing. Thus, even if the image deformation processing is reduction of an image or enlargement of a reduced image, for example, the image deformation processing in which the quality of the image is hardly reduced can be performed. Thus, according to the first exemplary embodiment, the peak value of the memory bandwidth can be reduced regardless of whether the image deformation processing is enlargement or reduction. Therefore, cost reduction can be implemented while the quality of the image hardly deteriorates.

A second exemplary embodiment will be described. Configurations according to the second exemplary embodiment are respectively similar to those illustrated in FIGS. 1 and 2, described above, and hence illustration of the configurations is omitted. Different portions from those in the first exemplary embodiment will be described below.

In the second exemplary embodiment, a method for calculation performed in a calculation unit 201 in a case where an upper limit of a memory bandwidth per pixel in a deformation unit 204 is determined as a predetermined upper limit value M_READ, for example, will be described. In the second exemplary embodiment, in an image processing apparatus which outputs one pixel per cycle, a unit of the predetermined upper limit value M_READ is [pixel/cycle].

To reduce the memory bandwidth per pixel in the deformation unit 204, a minimum value of a reduction ratio sent from the calculation unit 201 to the deformation unit 204 may be increased. The minimum value of the reduction ratio in the deformation unit 204, a minimum value of a reduction ratio in a divided area, and a maximum value of the reduction ratio in the divided area have a relationship given by a following formula (6):

Minimum value of reduction ratio in deformation unit=minimum value/maximum value of reduction ratio in divided area (6)

Thus, in the second exemplary embodiment, the calculation unit 201 finds a minimum value "ratioXmin (tx, ty)" of an X-direction reduction ratio and a minimum value "ratioYmin (tx, ty)" of a Y-direction reduction ratio for each divided area. The calculation unit 201 sets the minimum value ratioXmin (tx, ty) of the X-direction reduction ratio and the minimum value ratioYmin (tx, ty) of the Y-direction reduction ratio for each divided area, and the upper-limit value M_READ to satisfy a relationship given by a following inequality formula (7):

$$(\text{ratio}X\min(tx,ty) \times \text{ratio}Y\min(tx,ty))/(\text{ratio}X(tx,ty) \times \text{ratio}Y(tx,ty)) < 1/M\_READ \quad (7)$$

However, an infinite number of values ratioX (tx, ty) and ratioY (tx, ty) satisfying the inequality formula (7) exist. In this case, when calculation given by a following formula (8) is performed, for example, the upper limit of the memory bandwidth can be set to the upper-limit value or less (M_READ or less):

$$\mathrm{ratio}X(tx,ty) = \sqrt{(M\_READ)} \times \mathrm{ratio}X\ \mathrm{min}(tx,ty)$$

$$\mathrm{ratio}Y(tx,ty) = \sqrt{(M\_READ)} \times \mathrm{ratio}Y\ \mathrm{min}(tx,ty) \quad (8)$$

Thus, in the second exemplary embodiment, the calculation unit 201 reduces, when calculating the reduction ratio for each divided area, the reduction ratio for the divided area in a case where the reduction ratio for the divided area in the deformation unit 204=the minimum value of the reduction ratio/the maximum value of the reduction ratio is below 1/M_READ. Therefore, according to the second exemplary embodiment, a peak value of the memory bandwidth can be set to the upper-limit value or less (M_READ or less). Thus, according to the second exemplary embodiment, image processing in which the peak value of the memory bandwidth is small in either case where image deformation is enlargement or reduction, and the quality of a reduced image does not deteriorate by, for example, enlarging the image can be implemented.

A third exemplary embodiment will be described. Configurations according to the third exemplary embodiment are respectively similar to those illustrated in FIGS. 1 and 2, described above, and hence illustration of the configurations is omitted. Different portions from those in the first exemplary embodiment will be described below.

In the third exemplary embodiment, a method for calculation performed in a calculation unit 201 in a case where an upper limit of a memory bandwidth per image corresponding to one screen in a deformation unit 204 (hereinafter represented as per screen) is determined as an upper-limit value M_READ, for example, will be described. In the third exemplary embodiment, a unit of the upper-limit value M_READ per screen is [pixel].

To set the upper limit of the memory bandwidth per screen in the deformation unit 204 to the upper-limit value or less (M_READ or less), the total number of pixels output by the reduction unit 202 may be set to the upper-limit value or less (M_READ or less). In the present exemplary embodiment, an example in which an X-direction reduction ratio "ratioX (tx, ty)" and a Y-direction reduction ratio "ratioY (tx, ty)" for each divided area are respectively multiplied by k times (k≤1.0) to reduce the total number of pixels for the divided area to set the upper limit of the memory bandwidth per screen to the upper-limit value M_READ or less is taken to simplify description. A method for reducing the number of pixels for each divided area is not limited to this example.

In the third exemplary embodiment, the calculation unit 201 first multiplies the number of pixels for each divided area by the X-direction reduction ratio ratioX (tx, ty) and the Y-direction reduction ratio ratioY (tx, ty) for the divided area, to calculate the number of pixels output by the reduction unit 202. The calculation unit 201 sums the respective calculated numbers of pixels for all the divided areas to obtain a total upper-limit value M_READ_ALL.

When a coefficient k (k<1.0) by which each of the X-direction reduction ratio ratioX (tx, ty) and the Y-direction reduction ratio ratioY (tx, ty) for each divided area is multiplied is set to k (k<1.0), for example, to set the upper limit of the memory bandwidth per screen to the upper-limit value M_READ or less, the coefficient k satisfies a following formula (9):

$$k^2 \times M\_READ\_ALL \leq M\_READ \quad (9)$$

Further, the calculation unit 201 solves the inequality formula (9), to select the coefficient k satisfying a formula (10):

$$k \leq \sqrt{(M\_READ/M\_READ\_ALL)} \quad (10)$$

The calculation unit 201 multiplies each of the X-direction reduction ratio ratioX (tx, ty) and the Y-direction reduction ratio ratioY (tx, ty) for each divided area by the coefficient k (e.g., k=√(M_READ/M_READ_ALL)), as expressed by a formula (11). Thus, the upper limit of the memory bandwidth per screen is set to the upper-limit value M_READ or less:

$$\mathrm{ratio}X(tx,ty) \times k, \mathrm{ratio}Y(tx,ty) \times k \quad (11)$$

As described above, in the third exemplary embodiment, the calculation unit 201 calculates the memory bandwidth per screen in the deformation unit 204 when calculating a by-divided area reduction ratio. The calculation unit 201 reduces, in a case where the upper limit of the memory bandwidth per screen exceeds the upper-limit value M_READ serving as the upper limit of the memory bandwidth, the by-divided area reduction ratio. Therefore, according to the third exemplary embodiment, the upper limit of the memory bandwidth per screen can be set to the upper-limit value M_READ or less. Thus, according to the third exemplary embodiment, image processing in which a peak value of the memory bandwidth is small in either case where image deformation is enlargement or reduction, and the quality of the reduced image is prevented from deteriorating by, for example, enlarging the image can be implemented.

While a configuration in which a reduction ratio is determined for each of a plurality of divided areas constituting an input image and each of the plurality of divided areas is reduced and stored in a memory has been mainly described in each of the above-described exemplary embodiments, the present disclosure is not limited to the configuration. More specifically, at least some of the plurality of divided areas constituting the input image may be reduced, and image data about the reduced divided area may be stored in the memory. In this case, image data about the divided areas, which have not yet been reduced, are also typically stored in the memory. An image subjected to deformation processing can also be generated based on the reduced divided image data stored in the memory and the divided image data which have not yet been reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the present embodiment, a peak value of a memory bandwidth of a frame buffer used for image deformation processing can be reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-158003, filed Aug. 10, 2016, which is hereby incorporated by reference herein in its entirety.

What is claimed is:

1. An image processing apparatus comprising:
    one or more processors, circuitry, or a combination thereof, that causes the apparatus to perform:
    determining a reduction ratio based on pixel coordinate values indicating each of a plurality of divided areas and a deformation parameter for image deformation processing for each of the plurality of divided areas constituting an input image;
    reducing, based on the reduction ratio determined for each of the divided areas, an image in the divided area and storing the reduced image in a memory; and
    performing image deformation processing based on the deformation parameter for the reduced image in the divided area stored in the memory,
    wherein in the determining, in a case where the reduction ratio for the divided area based on the deformation parameter and the pixel coordinate values is greater than one, the reduction ratio is one.

2. The image processing apparatus according to claim 1, wherein the determining finds for each of the divided areas a maximum value of a plurality of reduction ratios obtained in the divided area, and determines the maximum value of the reduction ratios as a reduction ratio for the divided area.

3. The image processing apparatus according to claim 2, wherein the determining determines a maximum value of respective X-direction reduction ratios and Y-direction reduction ratios at pixel coordinates of four corners of the rectangular divided area as a reduction ratio for the divided area.

4. The image processing apparatus according to claim 3, wherein the determining determines, in a case where the X-direction reduction ratio for the divided area based on the deformation parameter exceeds one, the X-direction reduction ratio as one, and determines, in a case where the Y-direction reduction ratio for the divided area based on the deformation parameter exceeds one, the Y-direction reduction ratio as one.

5. The image processing apparatus according to claim 1, wherein the determining performs the image deformation processing by calculating pixel coordinates in the divided area corresponding to pixel coordinates in the reduced divided area stored in the memory based on the deformation parameter and by reading out data based on the calculated pixel coordinates from the memory.

6. The image processing apparatus according to claim 5, wherein the determining performs the image deformation processing by calculating pixel coordinates at four corners of the divided area corresponding to pixel coordinates at the four corners of the reduced rectangular divided area stored in the memory based on the deformation parameter, by calculating pixel coordinates used for interpolation based on the calculated pixel coordinates at the four corners, and by reading out data based on the pixel coordinates used for the interpolation from the memory.

7. The image processing apparatus according to claim 1, wherein the determining finds, when an upper limit of a memory bandwidth per pixel is determined as a predetermined upper limit value, for each of the divided areas respective maximum values and minimum values of reduction ratios in the divided area, and reduces, in a case where a minimum value/maximum value of the reduction ratios for the divided area is below the predetermined upper limit value, the reduction ratios for the divided area to set the upper limit of the memory bandwidth to the predetermined upper limit value or less.

8. The image processing apparatus according to claim 1, wherein the determining calculates, when an upper limit of a memory bandwidth per image corresponding to one screen is determined as a predetermined upper limit value, the memory bandwidth per image corresponding to one screen in the image deformation processing, and reduces, in a case where the memory bandwidth per image corresponding to one screen exceeds the predetermined upper limit value serving as the upper limit of the memory bandwidth, for each of the divided areas the reduction ratio in the divided area to set the upper limit of the memory bandwidth per image corresponding to one screen to the predetermined upper limit value or less.

9. The image processing apparatus according to claim 1, wherein the determining determines a deformation amount of an image in each of the divided areas based on the reduction ratio determined by the determination unit for the divided area and the deformation parameter.

10. The image processing apparatus according to claim 1, wherein the determining determines reduction ratios for some of the divided areas constituting the input image, and
    wherein the reducing respectively reduces, for some of the divided areas constituting the input image, respective images in the divided areas and stores the reduced images in the memory based on the determined reduction ratios.

11. An image processing method for an image processing apparatus, the method comprising:
    determining a reduction ratio based on pixel coordinate values indicating each of a plurality of divided areas and a deformation parameter for image deformation processing for each of the plurality of divided areas constituting an input image;
    reducing, based on the reduction ratio determined for each of the divided areas, an image in the divided area and storing the reduced image in a memory; and
    performing image deformation processing based on the deformation parameter for the reduced image in the divided area stored in the memory,
    wherein, in the determining, in a case where the reduction ratio for the divided area based on the deformation parameter and the pixel coordinate values is greater than one, the reduction ratio is one.

12. A storage medium storing a program for causing a computer to execute a method comprising:
  determining a reduction ratio based on pixel coordinate values indicating each of a plurality of divided areas and a deformation parameter for image deformation processing for each of the plurality of divided areas constituting an input image;
  reducing, based on the reduction ratio determined for each of the divided areas, an image in the divided area and storing the reduced image in a memory; and
  performing image deformation processing based on the deformation parameter for the reduced image in the divided area stored in the memory,
  wherein, in the determining, in a case where the reduction ratio for the divided area based on the deformation parameter and the pixel coordinate values is greater than one, the reduction ratio is one.

* * * * *